US012639698B2

(12) United States Patent
Irukula et al.

(10) Patent No.: US 12,639,698 B2
(45) Date of Patent: May 26, 2026

(54) SYSTEMS, METHODS, AND COMPUTER PROGRAM PRODUCTS FOR AUTOMATICALLY SELECTING A CARD FOR CONTACTLESS PAYMENT

(71) Applicant: Visa International Service Association, San Francisco, CA (US)

(72) Inventors: Deepak Irukula, Nizamabad (IN); Vinod Kumar Pinniboyina, Bangaluru (IN); Habeeb Shaik Khadar, Chittoor (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/847,727

(22) PCT Filed: Jun. 3, 2022

(86) PCT No.: PCT/US2022/032038
§ 371 (c)(1),
(2) Date: Sep. 17, 2024

(87) PCT Pub. No.: WO2023/234943
PCT Pub. Date: Dec. 7, 2023

(65) Prior Publication Data
US 2025/0200549 A1      Jun. 19, 2025

(51) Int. Cl.
*G06Q 20/34*          (2012.01)
*G06Q 20/22*          (2012.01)

(52) U.S. Cl.
CPC ......... *G06Q 20/352* (2013.01); *G06Q 20/227* (2013.01); *G06Q 20/341* (2013.01); *G06Q*

20/3555 (2013.01); *G06Q 20/3563* (2013.01); *G06Q 20/357* (2013.01)

(58) Field of Classification Search
CPC .. G06Q 20/227; G06Q 20/352; G06Q 20/341; G06Q 20/3555; G06Q 20/3563; G06Q 20/357; G07F 7/0833
See application file for complete search history.

(56) References Cited

U.S. PATENT DOCUMENTS

| | | | |
|---|---|---|---|
| 10,410,232 B1 | 9/2019 | Lueken | |
| 2009/0037326 A1 | 2/2009 | Chitti et al. | |
| 2014/0025567 A1* | 1/2014 | Rigby | G06Q 20/10 705/39 |
| 2020/0320507 A1* | 10/2020 | Smets | G06Q 20/3278 |

* cited by examiner

*Primary Examiner* — Eric T Wong
(74) *Attorney, Agent, or Firm* — The Webb Law Firm

(57) ABSTRACT

Provided is a method for automatically selecting one of a plurality of payment cards for contactless payment. The method may include receiving, by a first priority input circuit of a first payment card of a plurality of payment cards, a priority adjusting input from a user. In response to receiving the priority adjusting input, adjusting the respective priority indicator of the first payment card based on the priority adjusting input. The method may further include, receiving by a respective communication circuit of each respective payment card of the plurality of payment cards, a polling request from a transaction terminal. In response to receiving the polling request, transmitting, by each respective communication circuit of each respective payment card of the plurality of payment cards, a respective response to the polling request. The response to the polling request may include a respective priority indicator for the respective payment card.

18 Claims, 8 Drawing Sheets

100

<u>200</u>

300

302

Receive a priority adjusting
input

304

Adjust the respective priority
indicator of a payment card

306

Receive a polling request from
a transaction terminal

308

Transmit a respective
response to the polling
request

310

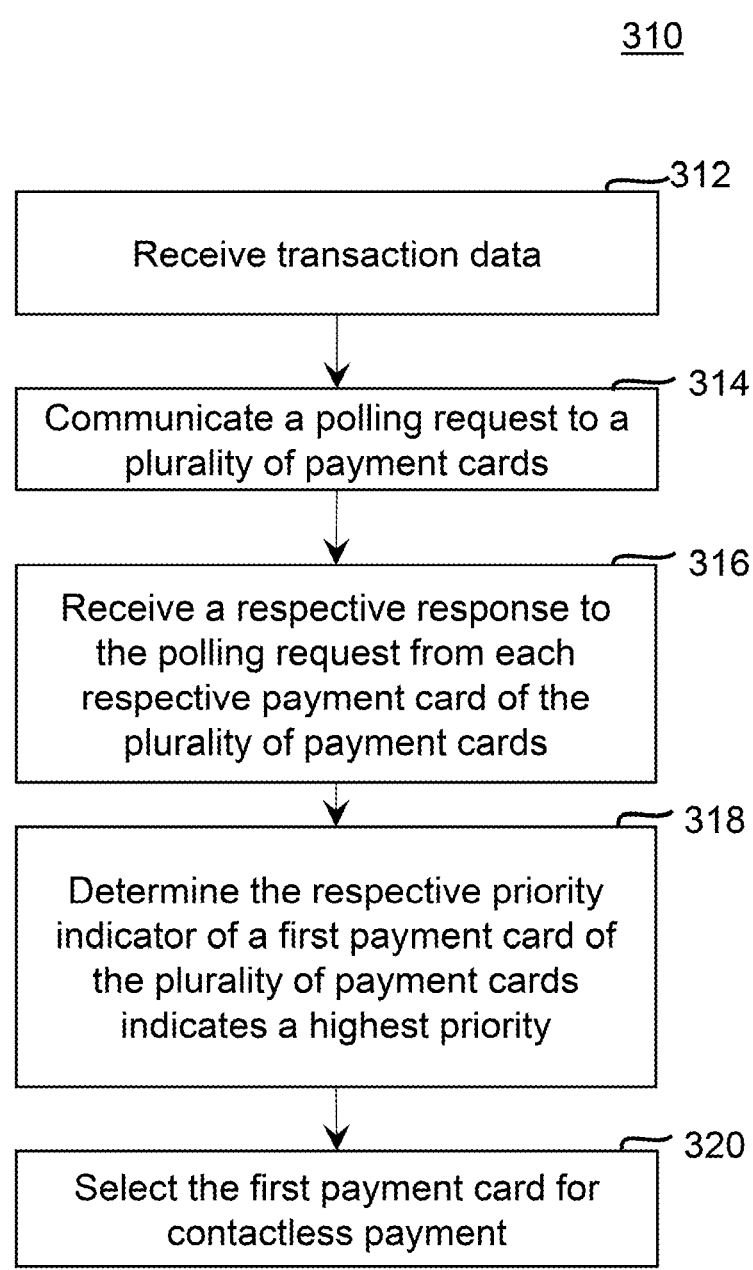

312

Receive transaction data

314

Communicate a polling request to a plurality of payment cards

316

Receive a respective response to the polling request from each respective payment card of the plurality of payment cards

318

Determine the respective priority indicator of a first payment card of the plurality of payment cards indicates a highest priority

320

Select the first payment card for contactless payment

SYSTEMS, METHODS, AND COMPUTER PROGRAM PRODUCTS FOR AUTOMATICALLY SELECTING A CARD FOR CONTACTLESS PAYMENT

CROSS REFERENCE TO RELATED APPLICATION

This application is the United States national phase of International Patent Application No. PCT/US22/32038 filed Jun. 3, 2022, the disclosure of which is hereby incorporated by reference in its entirety.

BACKGROUND

1. Technical Field

This disclosure relates generally to selecting a contactless payment instrument and, in some non-limiting embodiments or aspects, systems, methods, and computer program products for automatically selecting one of a plurality of cards for contactless payment.

2. Technical Considerations

Contactless payments include payment transactions made by holding or tapping a payment instrument (e.g., contactless chip card, payment-enabled mobile device, payment-enabled wearable device, etc.) over a contactless payment-enabled terminal. Contactless payments eliminate the need for a user to physically touch (e.g., swipe or insert) a payment instrument at a payment terminal. In some instances, contactless chip cards and/or contactless payment-enabled terminals may communicate wirelessly, such as via radio-frequency identification (RFID) or near-field communication (NFC). Users, in close proximity to the contactless payment-enabled terminal, may hold or tap a payment instrument over a reader of the contactless payment-enabled terminal to complete payment transactions.

However, if users carry more than one payment instrument, they must select which payment instrument to use for each payment transaction. For example, if a user carries more than one contactless chip card in a physical wallet, the user must select from the wallet a single contactless chip card to use for each payment transaction. If the user holds or taps more than one contactless chip card over the contactless payment-enabled terminal, the contactless payment-enabled terminal may communicate with a contactless chip card other than the one the user intended to use for the payment transaction and/or the wireless signals from the multiple contactless chip cards may interfere with each other, thereby preventing the contactless payment-enabled terminal from correctly receiving the signals.

SUMMARY

Accordingly, provided are improved systems, methods, and computer program products for automatically selecting one of a plurality of cards for contactless payment.

According to non-limiting embodiments or aspects, provided is a method for automatically selecting one of a plurality of payment cards for contactless payment. In some non-limiting embodiments or aspects, the method may include receiving, by a first priority input circuit of a first payment card of a plurality of payment cards, a priority adjusting input, where each respective payment card of the plurality of payment cards comprises a respective priority input circuit, a respective priority indication circuit, and a respective communication circuit, where each respective priority indication circuit stores a respective priority indicator for the respective payment card, the respective priority input circuit of the first payment card comprises the first priority input circuit, the respective priority indication circuit of the first payment card comprises a first priority indication circuit, and the respective communication circuit of the first payment card comprises a first communication circuit. In some non-limiting embodiments or aspects, the method may include, in response to receiving the priority adjusting input, adjusting, by the first priority indication circuit, the respective priority indicator of the first payment card based on the priority adjusting input. In some non-limiting embodiments or aspects, the method may include receiving, by each respective communication circuit of each respective payment card of the plurality of payment cards, a polling request from a transaction terminal. In some non-limiting embodiments or aspects, the method may include, in response to receiving the polling request, transmitting, by each respective communication circuit of each respective payment card of the plurality of payment cards, a respective response to the polling request, each respective response to the polling request comprising the respective priority indicator for the respective payment card, the respective priority indicator of the first payment card indicates a highest priority for selection for contactless payment by the transaction terminal.

In some non-limiting embodiments or aspects, each respective priority indication circuit of each respective payment card of the plurality of payment cards may include a respective memory and a respective processor.

In some non-limiting embodiments or aspects, each respective priority input circuit of each respective payment card of the plurality of payment cards may include at least two touchpoints, where when receiving the priority adjusting input, the method may further include: receiving the priority adjusting input via one of the at least two touchpoints of the first payment card.

In some non-limiting embodiments or aspects, the method may include transmitting, by the first priority input circuit, the priority adjusting input to the first priority indication circuit.

In some non-limiting embodiments or aspects, the method may include receiving, by the first priority indication circuit, the priority adjusting input from the first priority input circuit; and in response to receiving the priority adjusting input, converting, by the first priority indication circuit, the priority adjusting input to a binary value to provide the respective priority indicator of the first payment card.

In some non-limiting embodiments or aspects, the method may include, adjusting the respective priority indicator of the first payment card based on the priority adjusting input may include: increasing the respective priority indicator of the first payment card based on the priority adjusting input; or decreasing the respective priority indicator of the first payment card based on the priority adjusting input.

In some non-limiting embodiments or aspects, the first priority indication circuit comprises a memory and the method may further include, after adjusting the respective priority indicator, storing, by the first priority indication circuit, the respective priority indicator of the first payment card in the memory.

In some non-limiting embodiments or aspects, the method may include, communicating, by the first priority indication circuit, the respective priority indicator of the first payment card to the first communication circuit.

In some non-limiting embodiments or aspects, each respective payment card of the plurality of payment cards comprises: a respective first chip, a respective second chip separate from the respective first chip, and a respective third chip separate from the respective first chip and the respective second chip; the respective first chip of the first payment card comprises the first priority input circuit; the respective second chip of the first payment card comprises the first priority indication circuit; and the respective third chip of the first payment card comprises the first communication circuit.

In some non-limiting embodiments or aspects, the respective second chip of the first payment card is configured to communicate with the respective first chip of the first payment card and the respective third chip of the first payment card.

According to non-limiting embodiments or aspects, provided is a system for automatically selecting one of a plurality of payment cards for contactless payment. In some non-limiting embodiments or aspects, the system may include a plurality of payment cards, each respective payment card of the plurality of payment cards may include a respective priority input circuit; a respective priority indication circuit, each respective priority indication circuit storing a respective priority indicator for the respective payment card; and a respective communication circuit. In some non-limiting embodiments or aspects, the plurality of payment cards may include a first payment card. In some non-limiting embodiments or aspects, the respective priority input circuit of the first payment card may include a first priority input circuit, the respective priority indication circuit of the first payment card may include a first priority indication circuit, and the respective communication circuit of the first payment card may include a first communication circuit. In some non-limiting embodiments or aspects, the first payment card may be configured to: receive, by the first priority input circuit, a priority adjusting input. In some non-limiting embodiments or aspects, the first payment card may be configured to, in response to receiving the priority adjusting input, adjust, by the first priority indication circuit, the respective priority indicator of the first payment card based on the priority adjusting input. In some non-limiting embodiments or aspects, each respective payment card of the plurality of payment cards may be configured to: receive, by each respective communication circuit of each respective payment card of the plurality of payment cards, a polling request from a transaction terminal; and in response to receiving the polling request, transmit, by each respective communication circuit of each respective payment card of the plurality of payment cards, a respective response to the polling request, each respective response to the polling request comprising the respective priority indicator for the respective payment card, the respective priority indicator of the first payment card indicating a highest priority for selection for contactless payment by the transaction terminal.

In some non-limiting embodiments or aspects, each respective priority indication circuit of each respective payment card of the plurality of payment cards comprises a respective memory and a respective processor.

In some non-limiting embodiments or aspects, each respective priority input circuit of each respective payment card of the plurality of payment cards comprises at least two touchpoints, and when receiving the priority adjusting input the first payment card may be configured to: receive the priority adjusting input via one of the at least two touchpoints of the first payment card.

In some non-limiting embodiments or aspects, the first payment card may be further configured to: transmit, by the first priority input circuit, the priority adjusting input to the first priority indication circuit.

In some non-limiting embodiments or aspects, the first payment card may be further configured to: receive, by the first priority indication circuit, the priority adjusting input from the first priority input circuit; and in response to receiving the priority adjusting input, convert, by the first priority indication circuit, the priority adjusting input to a binary value to provide the respective priority indicator of the first payment card.

In some non-limiting embodiments or aspects, when adjusting the respective priority indicator of the first payment card based on the priority adjusting input, the first payment card may be configured to: increase the respective priority indicator of the first payment card based on the priority adjusting input; or decrease the respective priority indicator of the first payment card based on the priority adjusting input.

In some non-limiting embodiments or aspects, the first priority indication circuit may include a memory, and the first payment card may be further configured to: after adjusting the respective priority indicator, store, the respective priority indicator of the first payment card in the memory.

In some non-limiting embodiments or aspects, the first payment card may be further configured to: communicate, by the first priority indication circuit, the respective priority indicator of the first payment card to the first communication circuit.

In some non-limiting embodiments or aspects, each respective payment card of the plurality of payment cards may include: a respective first chip, a respective second chip separate from the respective first chip, and a respective third chip separate from the respective first chip and the respective second chip; the respective first chip of the first payment card comprises the first priority input circuit; the respective second chip of the first payment card comprises the first priority indication circuit; and the respective third chip of the first payment card comprises the first communication circuit.

In some non-limiting embodiments or aspects, the respective second chip of the first payment card may be configured to communicate with the respective first chip of the first payment card and the respective third chip of the first payment card.

According to non-limiting embodiments or aspects, provided is a method for automatically selecting one of a plurality of payment cards for contactless payment. In some non-limiting embodiments or aspects, the method may include receiving, by a transaction terminal, transaction data associated with at least one transaction. In some non-limiting embodiments or aspects, the method may include, in response to receiving the transaction data, communicating, by the transaction terminal, a polling request to a plurality of payment cards within an operating range of the transaction terminal. In some non-limiting embodiments or aspects, the method may include receiving, by the transaction terminal, a respective response to the polling request from each respective payment card of the plurality of payment cards, each respective response to the polling request comprising a respective priority indicator for the respective payment card. In some non-limiting embodiments or aspects, the method may include determining, by the transaction terminal, the respective priority indicator of a first payment card of the plurality of payment cards indicates a highest priority. In some non-limiting embodiments or aspects, the method may include selecting, by the transaction terminal, the first payment card for contactless payment based on the respective priority indicator of the first payment card indicating the highest priority.

In some non-limiting embodiments or aspects, selecting the first payment card for contactless payment may include: comparing the respective priority indicator of each respective payment card of the plurality of payment cards; determining the first payment card of the plurality of payment cards has a greatest priority indicator; and selecting the first payment card for contactless payment based on the first payment card of the plurality of payment cards having the greatest priority indicator.

In some non-limiting embodiments or aspects, the method may include generating a communication based on the respective response to the polling request of each payment card of the plurality of payment cards detected within the operating range of the transaction terminal; and displaying data associated with the communication via a graphical user interface.

In some non-limiting embodiments or aspects the transaction terminal may be a NFC-enabled transaction terminal. According to non-limiting embodiments or aspects, provided is a system for automatically selecting one of a plurality of payment cards for contactless payment. In some non-limiting embodiments or aspects, the system may include a transaction terminal. In some non-limiting embodiments or aspects, the transaction terminal may be configured to: receive transaction data associated with at least one transaction; in response to receiving the transaction data, communicate a polling request to a plurality of payment cards within an operating range of the transaction terminal; receive a respective response to the polling request from each respective payment card of the plurality of payment cards, each respective response to the polling request comprising a respective priority indicator for the respective payment card; determine the respective priority indicator of a first payment card of the plurality of payment cards indicates a highest priority; and select the first payment card for contactless payment based on the respective priority indicator of the first payment card indicating the highest priority.

In some non-limiting embodiments or aspects, when selecting the first payment card for contactless payment, the transaction terminal may be configured to: compare the respective priority indicator of each respective payment card of the plurality of payment cards; determine the first payment card of the plurality of payment cards has a greatest priority indicator; and select the first payment card for contactless payment based on the first payment card of the plurality of payment cards having the greatest priority indicator.

In some non-limiting embodiments or aspects, the transaction terminal may be further configured to: generate a communication based on the respective response to the polling request of each payment card of the plurality of payment cards detected within the operating range of the transaction terminal; and display data associated with the communication via a graphical user interface.

According to non-limiting embodiments or aspects, provided is a computer program product for automatically selecting one of a plurality of payment cards for contactless payment. In some non-limiting embodiments or aspects, the computer program product may include at least one non-transitory computer-readable medium including one or more instructions that, when executed by at least one processor cause the at least one processor to: receive transaction data associated with at least one transaction. In some non-limiting embodiments or aspects, the one or more instructions may cause the at least one processor to, in response to receiving the transaction data, communicate a polling request to a plurality of payment cards within an operating range of the transaction terminal. In some non-limiting embodiments or aspects, the one or more instructions may cause the at least one processor to receive a respective response to the polling request from each respective payment card of the plurality of payment cards, each respective response to the polling request comprising a respective priority indicator for the respective payment card. In some non-limiting embodiments or aspects, the one or more instructions may further cause the at least one processor to determine the respective priority indicator of a first payment card of the plurality of payment cards indicates a highest priority. In some non-limiting embodiments or aspects, the one or more instructions may cause the at least one processor to select the first payment card for contactless payment based on the respective priority indicator of the first payment card indicating the highest priority.

In some non-limiting embodiments or aspects, when selecting the first payment card for contactless payment, the one or more instructions may cause the at least one processor to: compare the respective priority indicator of each respective payment card of the plurality of payment cards; determine the first payment card of the plurality of payment cards has a greatest priority indicator; and select the first payment card for contactless payment based on the first payment card of the plurality of payment cards having the greatest priority indicator.

In some non-limiting embodiments or aspects, the one or more instructions may cause the at least one processor to: generate a communication based on the respective response to the polling request of each payment card of the plurality of payment cards detected within the operating range of the transaction terminal; and display data associated with the communication via a graphical user interface.

Other non-limiting embodiments or aspects will be set forth in the following numbered clauses:

Clause 1: A method for automatically selecting one of a plurality of payment cards for contactless payment comprising: receiving, by a first priority input circuit of a first payment card of a plurality of payment cards, a priority adjusting input, wherein each respective payment card of the plurality of payment cards comprises a respective priority input circuit, a respective priority indication circuit, and a respective communication circuit, wherein each respective priority indication circuit stores a respective priority indicator for the respective payment card, wherein the respective priority input circuit of the first payment card comprises the first priority input circuit, wherein the respective priority indication circuit of the first payment card comprises a first priority indication circuit, wherein the respective communication circuit of the first payment card comprises a first communication circuit; in response to receiving the priority adjusting input, adjusting, by the first priority indication circuit, the respective priority indicator of the first payment card based on the priority adjusting input; receiving, by each respective communication circuit of each respective payment card of the plurality of payment cards, a polling request from a transaction terminal; and in response to receiving the polling request, transmitting, by each respective communication circuit of each respective payment card of the plurality of payment cards, a respective response to the polling request, each respective response to the polling request comprising the respective priority indicator for the respective payment card, wherein the respective priority indicator of the first payment card indicates a highest priority for selection for contactless payment by the transaction terminal.

Clause 2: The method of clause 1, wherein each respective priority indication circuit of each respective payment card of the plurality of payment cards comprises a respective memory and a respective processor.

Clause 3: The method of clause 1 or clause 2, wherein each respective priority input circuit of each respective payment card of the plurality of payment cards comprises at least two touchpoints, wherein receiving the priority adjusting input comprises: receiving the priority adjusting input via one of the at least two touchpoints of the first payment card.

Clause 4: The method of any of clauses 1-3, further comprising: transmitting, by the first priority input circuit, the priority adjusting input to the first priority indication circuit.

Clause 5: The method of any of clauses 1-4, further comprising: receiving, by the first priority indication circuit, the priority adjusting input from the first priority input circuit; and in response to receiving the priority adjusting input, converting, by the first priority indication circuit, the priority adjusting input to a binary value to provide the respective priority indicator of the first payment card.

Clause 6: The method of any of clauses 1-5, wherein adjusting the respective priority indicator of the first payment card based on the priority adjusting input comprises: increasing the respective priority indicator of the first payment card based on the priority adjusting input; or decreasing the respective priority indicator of the first payment card based on the priority adjusting input.

Clause 7: The method of any of clauses 1-6, wherein the first priority indication circuit comprises a memory, the method further comprising, after adjusting the respective priority indicator, storing, by the first priority indication circuit, the respective priority indicator of the first payment card in the memory.

Clause 8: The method of any of clauses 1-7, further comprising: communicating, by the first priority indication circuit, the respective priority indicator of the first payment card to the first communication circuit.

Clause 9: The method of any of clauses 1-8, wherein each respective payment card of the plurality of payment cards comprises: a respective first chip, a respective second chip separate from the respective first chip, and a respective third chip separate from the respective first chip and the respective second chip; wherein the respective first chip of the first payment card comprises the first priority input circuit; wherein the respective second chip of the first payment card comprises the first priority indication circuit; and wherein the respective third chip of the first payment card comprises the first communication circuit.

Clause 10: The method of any of clauses 1-9, wherein the respective second chip of the first payment card is configured to communicate with the respective first chip of the first payment card and the respective third chip of the first payment card.

Clause 11: A system for automatically selecting one of a plurality of payment cards for contactless payment, the system comprising: the plurality of payment cards, wherein each respective payment card of the plurality of payment cards comprises: a respective priority input circuit; a respective priority indication circuit, each respective priority indication circuit storing a respective priority indicator for the respective payment card; and a respective communication circuit, wherein the plurality of payment cards comprises a first payment card, the respective priority input circuit of the first payment card comprising a first priority input circuit, the respective priority indication circuit of the first payment card comprising a first priority indication circuit, the respective communication circuit of the first payment card comprising a first communication circuit, the first payment card configured to: receive, by the first priority input circuit, a priority adjusting input; and in response to receiving the priority adjusting input, adjust, by the first priority indication circuit, the respective priority indicator of the first payment card based on the priority adjusting input, and wherein each respective payment card of the plurality of payment cards is configured to: receive, by each respective communication circuit of each respective payment card of the plurality of payment cards, a polling request from a transaction terminal; and in response to receiving the polling request, transmit, by each respective communication circuit of each respective payment card of the plurality of payment cards, a respective response to the polling request, each respective response to the polling request comprising the respective priority indicator for the respective payment card, the respective priority indicator of the first payment card indicating a highest priority for selection for contactless payment by the transaction terminal.

Clause 12: The system of clause 11, wherein each respective priority indication circuit of each respective payment card of the plurality of payment cards comprises a respective memory and a respective processor.

Clause 13: The system of clause 11 or clause 12, wherein each respective priority input circuit of each respective payment card of the plurality of payment cards comprises at least two touchpoints, and wherein when receiving the priority adjusting input, the first payment card is configured to: receive the priority adjusting input via one of the at least two touchpoints of the first payment card.

Clause 14: The system of any of clauses 11-13, wherein the first payment card is further configured to: transmit, by the first priority input circuit, the priority adjusting input to the first priority indication circuit.

Clause 15: The system of any of clauses 11-14, wherein the first payment card is further configured to: receive, by the first priority indication circuit, the priority adjusting input from the first priority input circuit; and in response to receiving the priority adjusting input, convert, by the first priority indication circuit, the priority adjusting input to a binary value to provide the respective priority indicator of the first payment card.

Clause 16: The system of any of clauses 11-15, wherein, when adjusting the respective priority indicator of the first payment card based on the priority adjusting input, the first payment card is configured to: increase the respective priority indicator of the first payment card based on the priority adjusting input; or decrease the respective priority indicator of the first payment card based on the priority adjusting input.

Clause 17: The system of any of clauses 11-16, wherein the first priority indication circuit comprises a memory, and wherein the first payment card is further configured to: after adjusting the respective priority indicator, store the respective priority indicator of the first payment card in the memory.

Clause 18: The system of any of clauses 11-17, wherein the first payment card is further configured to: communicate, by the first priority indication circuit, the respective priority indicator of the first payment card to the first communication circuit.

Clause 19: The system of any of clauses 11-18, wherein each respective payment card of the plurality of payment cards comprises: a respective first chip, a respective second chip separate from the respective first chip, and a respective third chip separate from the respective first chip and the respective second chip, wherein the respective first chip of the first payment card comprises the first priority input circuit, wherein the respective second chip of the first payment card comprises the first priority indication circuit, and wherein the respective third chip of the first payment card comprises the first communication circuit.

Clause 20: The system of any of clauses 11-19, wherein the respective second chip of the first payment card is configured to communicate with the respective first chip of the first payment card and the respective third chip of the first payment card.

Clause 21: A method for automatically selecting one of a plurality of payment cards for contactless payment, comprising: receiving, by a transaction terminal, transaction data associated with at least one transaction; in response to receiving the transaction data, communicating, by the transaction terminal, a polling request to a plurality of payment cards within an operating range of the transaction terminal; receiving, by the transaction terminal, a respective response to the polling request from each respective payment card of the plurality of payment cards, each respective response to the polling request comprising a respective priority indicator for the respective payment card; determining, by the transaction terminal, the respective priority indicator of a first payment card of the plurality of payment cards indicates a highest priority; and selecting, by the transaction terminal, the first payment card for contactless payment based on the respective priority indicator of the first payment card indicating the highest priority.

Clause 22: The method of clause 21, wherein selecting the first payment card for contactless payment comprises: comparing the respective priority indicator of each respective payment card of the plurality of payment cards; determining the first payment card of the plurality of payment cards has a greatest priority indicator; and selecting the first payment card for contactless payment based on the first payment card of the plurality of payment cards having the greatest priority indicator.

Clause 23: The method of clause 21 or clause 22, further comprising: generating a communication based on the respective response to the polling request from each payment card of the plurality of payment cards detected within the operating range of the transaction terminal; and displaying data associated with the communication via a graphical user interface.

Clause 24: The method of any of clauses 21-23, wherein the transaction terminal is a NFC-enabled transaction terminal.

Clause 25: A system for automatically selecting one of a plurality of payment cards for contactless payment, comprising a transaction terminal, wherein the transaction terminal is configured to: receive transaction data associated with at least one transaction; in response to receiving the transaction data, communicate a polling request to a plurality of payment cards within an operating range of the transaction terminal; receive a respective response to the polling request from each respective payment card of the plurality of payment cards, each respective response to the polling request comprising a respective priority indicator for the respective payment card; determine the respective priority indicator of a first payment card of the plurality of payment cards indicates a highest priority; and select the first payment card for contactless payment based on the respective priority indicator of the first payment card indicating the highest priority.

Clause 26: The system of clause 25, wherein when selecting the first payment card for contactless payment, the transaction terminal is configured to: compare the respective priority indicator of each respective payment card of the plurality of payment cards; determine the first payment card of the plurality of payment cards has a greatest priority indicator; and select the first payment card for contactless payment based on the first payment card of the plurality of payment cards having the greatest priority indicator.

Clause 27: The system of clause 25 or clause 26, wherein the transaction terminal is further configured to: generate a communication based on the respective response to the polling request from each payment card of the plurality of payment cards detected within the operating range of the transaction terminal; and display data associated with the communication via a graphical user interface.

Clause 28: The system of any of clauses 25-27, wherein the transaction terminal is a NFC-enabled transaction terminal.

Clause 29: A computer program product for automatically selecting one of a plurality of payment cards for contactless payment, comprising at least one non-transitory computer-readable medium including one or more instructions that, when executed by at least one processor cause the at least one processor to: receive transaction data associated with at least one transaction; in response to receiving the transaction data, communicate a polling request to a plurality of payment cards within an operating range of a transaction terminal; receive a respective response to the polling request from each respective payment card of the plurality of payment cards, each respective response to the polling request comprising a respective priority indicator for the respective payment card; determine the respective priority indicator of a first payment card of the plurality of payment cards indicates a highest priority; and select the first payment card for contactless payment based on the respective priority indicator of the first payment card indicating the highest priority.

Clause 30: The computer program product of clause 29, wherein when selecting the first payment card for contactless payment, the one or more instructions cause the at least one processor to: compare the respective priority indicator of each respective payment card of the plurality of payment cards; determine the first payment card of the plurality of payment cards has a greatest priority indicator; and select the first payment card for contactless payment based on the first payment card of the plurality of payment cards having the greatest priority indicator.

Clause 31: The computer program product of clause 29 or clause 30, wherein the one or more instructions cause the at least one processor to: generate a communication based on the respective response to the polling request of each payment card of the plurality of payment cards detected within the operating range of the transaction terminal; and display data associated with the communication via a graphical user interface.

Clause 32: The computer program product of any of clauses 29-31, wherein the transaction terminal is a NFC-enabled transaction terminal.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments or aspects that are illustrated in the accompanying schematic figures, in which:

FIG. 3B is a flow diagram of a process for automatically selecting one of a plurality of cards for contactless payment according to non-limiting embodiments or aspects of the disclosed subject matter;

DETAILED DESCRIPTION

Figure 1A:
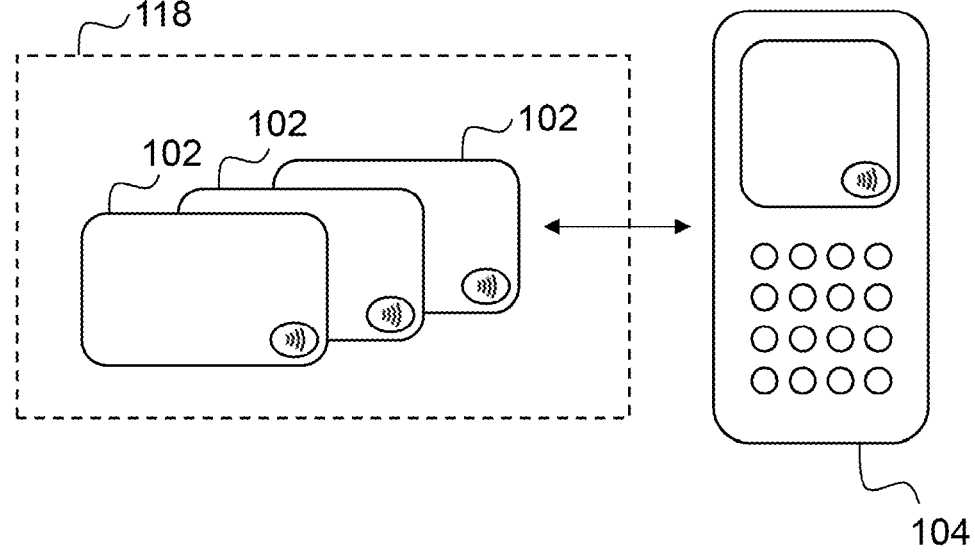
FIGS. 1A and 1B are diagrams of a system for automatically selecting one of a plurality of cards for contactless payment according to non-limiting embodiments or aspects of the disclosed subject matter.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "acquirer" and/or "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer and/or acquirer institution may be a financial institution, such as a bank. As used herein, the term "acquirer system" may refer to one or more computing devices operated by or on behalf of an acquirer and/or acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/ or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the terms "payment device" and/or "payment instrument" may refer to an electronic payment device, an electronic payment instrument, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Provided are methods, systems, and computer program products for automatically selecting one of a plurality of cards for contactless payment. Non-limiting embodiments or aspects of the present disclosure may include a plurality of payment cards, and each respective payment card may include a respective priority input circuit, a respective priority indication circuit, and a respective communication circuit. For example, each respective priority indication circuit may store a respective priority indicator for the respective payment card. A first priority input circuit of a first payment card (of the plurality of payment cards) may receive a priority adjusting input. In response to receiving the priority adjusting input, the first priority indication circuit may adjust the respective priority indicator of the first payment card based on the priority adjusting input. Thereafter, each respective communication circuit of each respective payment card may receive a polling request from a transaction terminal, and in response to receiving the polling request, each respective communication circuit of each respective payment card may transmit a respective response to the polling request, each respective response including the respective priority indicator for the respective payment card. For example, the respective priority indicator of the first payment card may indicate a highest priority for selection for contactless payment by the transaction terminal. In this way, non-limiting embodiments or aspects of the present disclosure allow a user to set a priority for each payment card in the user's physical wallet. Additionally, non-limiting embodiments or aspects of the present disclosure enable the payment cards in a user's wallet to communicate with a transaction terminal to indicate the priority for each card. Furthermore, non-limiting embodiments or aspects of the present disclosure enable the transaction terminal to communicate with multiple cards simultaneously and automatically select the card with the highest priority for contactless payment. As such, once the priority is set for a user's cards, the user is no longer required to remove a payment card from his wallet and/or separate one payment card from the remaining payment cards in the wallet to complete a payment transaction. Accordingly, the present disclosure enables a user to complete a contactless payment transaction using a preferred payment card automatically in a reduced amount of time without the need to remove any payment card from a container (e.g., wallet).

Figure 1B:
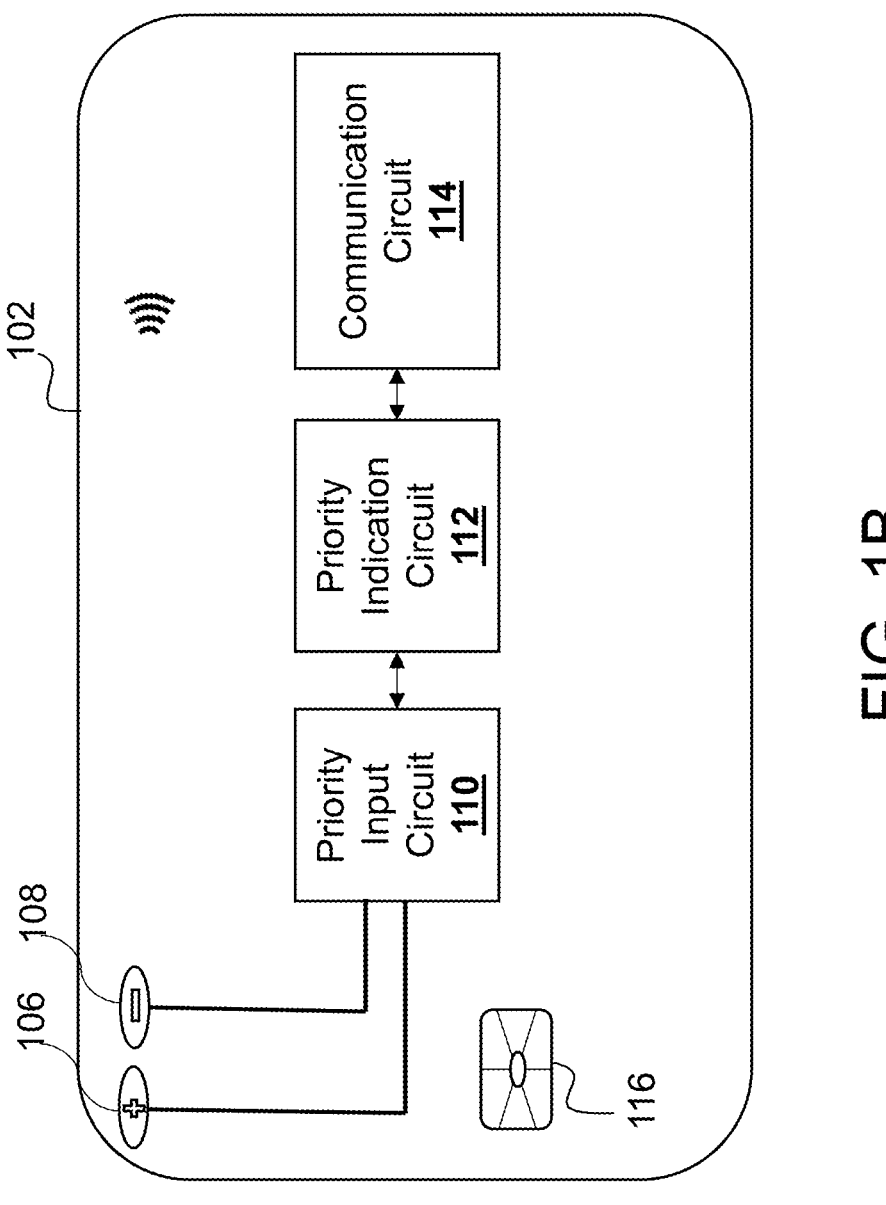

FIGS. 1A and 1B are diagrams of system 100 for automatically selecting one of a plurality of cards for contactless payment according to some non-limiting embodiments or aspects. As shown in FIG. 1A, system 100 may include a plurality of payment cards 102 and/or transaction terminal 104.

In some non-limiting embodiments or aspects, at least one of payment cards 102 (e.g., each of the payment cards 102) may include a contactless payment-enabled payment card. In some non-limiting embodiments or aspects, each respective payment card 102 may be linked to a respective account and/or account identifier associated with a user. For example, at least one of the payment cards 102 may be linked to a credit card account, a bank account (e.g., a savings account and/or a checking account), and/or the like of a user. In some non-limiting embodiments or aspects, the payment cards 102 may be physical payment cards such as credit cards, debit cards, gift cards, and/or the like.

In some non-limiting embodiments or aspects, at least one of payment cards 102 (e.g., each of the payment cards 102) may include one or more devices capable of communicating with transaction terminal 104. For example, each payment card 102 may communicate with transaction terminal 104 via a wireless communication connection, such as a short range wireless communication connection (e.g., an NFC connection, an RFID communication connection, and/or the like).

In some non-limiting embodiments or aspects, transaction terminal 104 may include one or more devices capable of communicating with one or more of the payment cards 102. For example, transaction terminal 104 may include one or more devices capable of communicating with one or more payment cards 102 via a wireless communication connection, such as a short range wireless communication connection (e.g., an NFC connection, an RFID communication connection, and/or the like). In some non-limiting embodiments or aspects, transaction terminal 104 may include a computing device, such as a client device, a group of client devices, and/or other like devices. In some non-limiting embodiments or aspects, transaction terminal 104 may be a POS device. For example, transaction terminal 104 may be a POS device, a group of POS device, and/or the like. For example, transaction terminal 104 may be a POS device located at a merchant location of a merchant. In some non-limiting embodiments or aspects, transaction terminal 104 may be an automated teller machine (ATM) terminal.

In some non-limiting embodiments or aspects, transaction terminal 104 may receive transaction data associated with at least one transaction. In some non-limiting embodiments or aspects, transaction terminal 104 may communicate a polling request to payment cards 102. For example, in response to receiving the transaction data, transaction terminal 104 may communicate a polling request to payment cards 102 within an operating range of transaction terminal 104. In some non-limiting embodiments or aspects, transaction terminal 104 may receive a respective response to the polling request from each respective payment card 102. Each respective response to the polling request may include a respective priority indicator for the respective payment card 102. In some non-limiting embodiments or aspects, transaction terminal 104 may determine that the respective priority indicator of a first payment card 102 of the plurality of payment cards 102 indicates a highest priority. In some non-limiting embodiments or aspects, transaction terminal 104 may select the first payment card 102 for contactless payment. For example, transaction terminal 104 may select the first payment card 102 for contactless payment based on the respective priority indicator of the first payment card 102 indicating the highest priority.

In some non-limiting embodiments or aspects, payment cards 102 may be located and/or stored in container 118. In some non-limiting embodiments or aspects, container 118 may be a physical container carried by a user, such as, a wallet, a money clip, a pocketbook, and/or the like. In some non-limiting embodiments or aspects, payment cards 102 located and/or stored in container 118 may communicate with transaction terminal 104 while remaining in container 118 (e.g., without being removed by the user).

With references to FIG. 1B, shown is a diagram of an exemplary payment card 102. In some non-limiting embodiments or aspects, payment card 102 may be a contactless payment-enabled payment card. In some non-limiting embodiments or aspects, payment card 102 may include one or more chips and/or integrated circuits. In some non-limiting embodiments or aspects, payment card 102 may include touchpoints 106, 108, priority input circuit 110, priority indication circuit 112, communication circuit 114, and chip 116.

In some non-limiting embodiments or aspects, payment card 102 may include at least two touchpoints 106, 108. In some non-limiting embodiments or aspects, touchpoints 106, 108 may be configured to be located on a face of payment card 102. For example, touchpoints 106, 108 may be located on a front surface and/or a back surface of payment card 102. In some non-limiting embodiments or aspects, touchpoints 106, 108 may be configured to be located on an edge of payment card 102. For example, touchpoints 106, 108 may be located on a top edge, a bottom edge, and/or a side edge of payment card 102. In some non-limiting embodiments or aspects, touchpoints 106, 108 may be used to set and/or adjust a priority indicator of payment card 102.

In some non-limiting embodiments or aspects, each of touchpoints 106, 108 may include a set of contact points of payment card 102 configured to respond to touch (e.g., from a user). For example, first touchpoint 106 may include a first set of metal contact points, and second touchpoint 108 may include a second set of metal contact points. In some non-limiting embodiments or aspects, each of touchpoints 106, 108 may include at least one button (e.g., a pushbutton and/or the like). In some non-limiting embodiments or aspects, touchpoints 106, 108 may include markers indicating an increase (e.g., "↑", "+", and/or the like) or a decrease (e.g., "↓", "−", and/or the like) of a priority adjusting input of payment card 102. For example, touchpoints 106, 108 may include up/down arrows and/or positive/negative symbols to indicate an increment/decrement of a priority adjusting input of payment card 102, respectively. For the purpose of illustration, as shown in FIG. 1B, first touchpoint 106 may include a "+" symbol to indicate an increment (e.g., of the priority indicator), and/or second touchpoint 108 may include a "−" symbol to indicate a decrement (e.g., of the priority indicator).

In some non-limiting embodiments or aspects, payment card 102 may include one or more touchpoints 106, 108. For example, payment card 102 may include a first touchpoint 106 (e.g., a first set of metal contact points) and/or a second touchpoint 108 (e.g., a second set of metal contact points). In some non-limiting embodiments or aspects, first touchpoint 106 may be configured to adjust (e.g., increment, set, and/or the like) a priority indicator of payment card 102. In some non-limiting embodiments or aspects, second touchpoint 108 may be configured to adjust (e.g., decrement, set, and/or the like) a priority indicator of payment card 102.

In some non-limiting embodiments or aspects, a user of payment card 102 may provide a priority adjusting input via touchpoints 106, 108. For example, priority input circuit 110 may receive a priority adjusting input from a user via at least one of touchpoints 106, 108. In some non-limiting embodiments or aspects, priority input circuit 110 may be configured to set and/or adjust a priority number for payment card 102 by adjusting the priority number for payment card 102 based on the priority adjusting input received from the user. In some non-limiting embodiments or aspects, priority input circuit 110 may include a memory and/or a processor.

In some non-limiting embodiments or aspects, priority input circuit 110 may be in communication with priority indication circuit 112. For example, priority indication circuit 110 may transmit the priority adjusting input to priority indication circuit 112. In some non-limiting embodiments or aspects, priority indication circuit 112 may receive the priority adjusting input from priority input circuit 110.

In some non-limiting embodiments or aspects, priority indication circuit 112 may adjust a priority indicator of payment card 102. For example, in response to receiving the priority adjusting input, priority indication circuit 112 may adjust a priority indicator of payment card 102 based on the priority adjusting input. In some non-limiting embodiments or aspects, priority indication circuit 112 may convert the priority adjusting input to a binary value. For example, in response to receiving the priority adjusting input, priority indication circuit 112 may convert the priority adjusting input to a binary value to provide the priority indicator of payment card 102. In some non-limiting embodiments or aspects, adjusting the priority indicator of payment card 102 based on the priority adjusting input may include increasing or decreasing the priority indicator of payment card 102. For example, adjusting the priority indicator of payment card 102 based on the priority adjusting input may include increasing or decreasing the priority indicator of payment card 102 based on the priority adjusting input.

In some non-limiting embodiments or aspects, the priority indicator of payment card 102 may indicate a level of priority for selection of payment card 102 for contactless payment. In some non-limiting embodiments or aspects, priority indication circuit 112 may include a memory and/or a processor. In some non-limiting embodiments or aspects, priority indication circuit 112 may store the priority indication number for payment card 102. For example, after adjusting the priority indicator, priority indication circuit 112 may store the priority indicator of payment card 102 in the memory of priority indication circuit 112. In some non-limiting embodiments or aspects, priority indication circuit 112 may store a binary value of the priority indication number for payment card 102. In some non-limiting embodiments or aspects, priority indication circuit 112 may increment or decrement a stored binary value of the priority indication number for payment card 102 based on the priority adjusting input.

In some non-limiting embodiments or aspects, priority indication circuit 112 may be in communication with communication circuit 114. For example, priority indication circuit 112 may communicate the priority indicator of payment card 102 to communication circuit 114.

In some non-limiting embodiments or aspects, communication circuit 114 may be in communication with transaction terminal 104. For example, communication circuit 114 may receive a polling request from transaction terminal 104. In some non-limiting embodiments or aspects, communication circuit 114 may transmit a response to the polling request. For example, in response to receiving the polling request, communication circuit 114 may transmit a response to the polling request to transaction terminal 104. The response to the polling request may include the priority indicator for payment card 102. In some non-limiting embodiments or aspects, communication circuit 114 may include a memory and/or a processor.

In some non-limiting embodiments or aspects, payment card 102 may include chip 116. In some non-limiting embodiments or aspects, chip 116 may include an integrated circuit. In some non-limiting embodiments or aspects, chip 116 may be an EMV chip. For example, chip 116 may be configured to EMV standards (e.g., based on ISO 7816, ISO 14443, and/or ISO 8583) for contactless payment-enabled payment cards.

In some non-limiting embodiments or aspects, payment card 102 may include a first chip, a second chip, and/or a third chip. In some non-limiting embodiments or aspects, the first chip may be separate from the second chip and/or separate from the third chip. In some non-limiting embodiments or aspects, the third chip may be separate from the first chip and/or the second chip. In some non-limiting embodiments or aspects, the first chip may include priority input circuit 110. In some non-limiting embodiments or aspects, the second chip may include priority indication circuit 112. In some non-limiting embodiments or aspects, the third chip may include communication circuit 114. In some non-limiting embodiments or aspects, the first chip, the second chip, and/or the third chip may be configured to communicate with each other. For example, the priority input circuit 110 of the first chip may communicate with the priority indication circuit 112 of the second chip, and priority indication circuit 112 of the second chip may communicate with communication circuit 114 of the third chip. In some non-limiting embodiments or aspects, the third chip may be in communication with transaction terminal 104, as described herein.

The number and arrangement of components shown in FIGS. 1A and 1B are provided as an example. In some non-limiting embodiments or aspects, system 100 may include additional components, fewer components, different components, or differently arranged components than those shown in FIGS. 1A and 1B. Additionally or alternatively, a set of components (e.g., one or more components) of system 100 may perform one or more functions described as being performed by another set of components of system 100.

Figure 2:
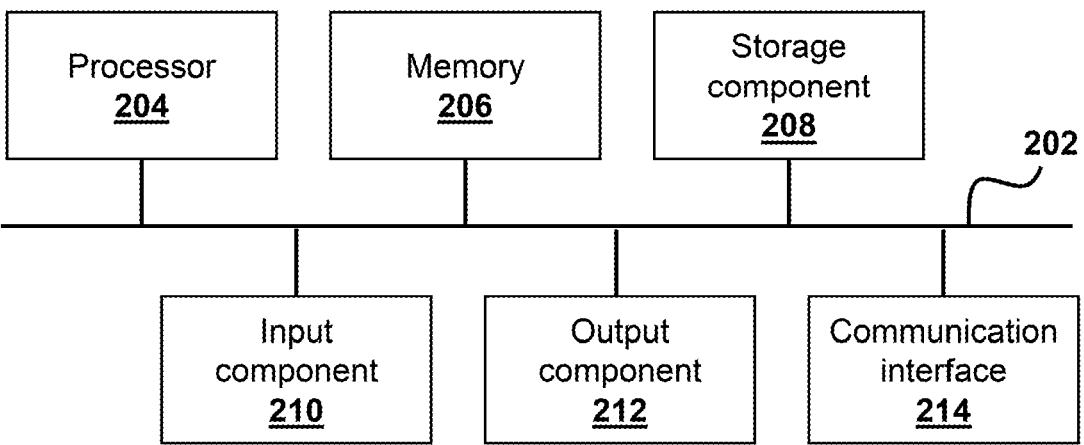
FIG. 2 is a diagram of example components of a device used in connection with non-limiting embodiments or aspects of the disclosed subject matter.

Referring now to FIG. 2, shown is a diagram of example components of a device 200 used in connection with non-limiting embodiments or aspects. Device 200 may correspond to transaction terminal 104 (e.g., one or more devices of transaction terminal 104). In some non-limiting embodiments or aspects, transaction terminal 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3A:
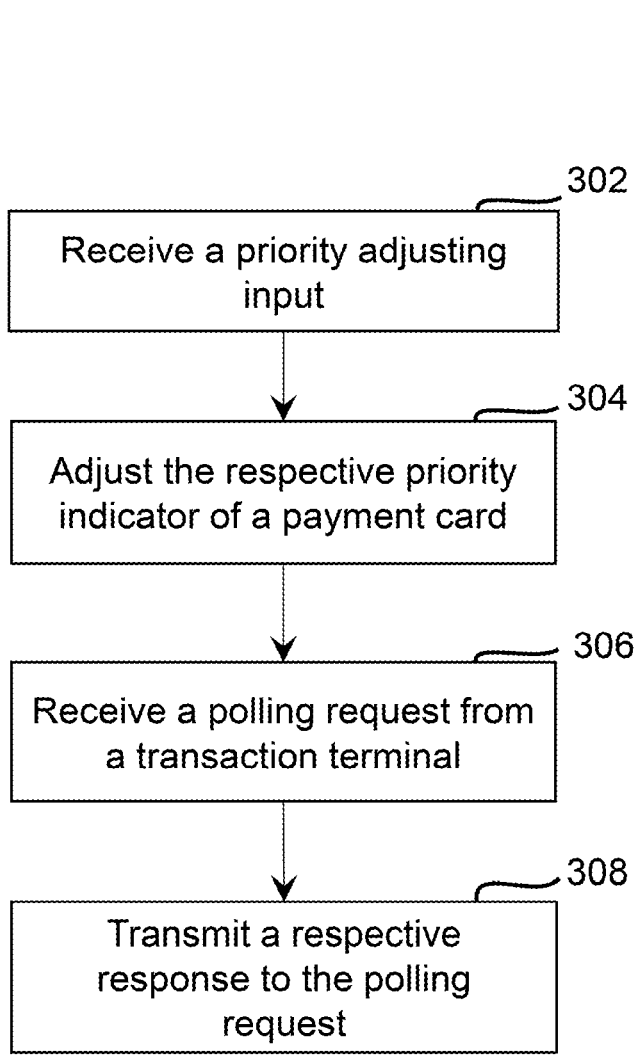
FIG. 3A is a flow diagram of a process for automatically selecting one of a plurality of cards for contactless payment according to non-limiting embodiments or aspects of the disclosed subject matter.

Referring now to FIG. 3A, shown is a flow diagram of a process 300 for automatically selecting one of a plurality of cards for contactless payment according to some non-limiting embodiments or aspects. In some non-limiting embodiments or aspects, one or more steps of process 300 may be executed by payment card(s) 102. Additionally or alternatively, one or more steps of process 300 may be executed (e.g., completely, partially, and/or the like) by another system, another device, another group of systems, or another group of devices, separate from or including payment card(s) 102, such as transaction terminal 104.

As shown in FIG. 3A at step 302, process 300 may include receiving a priority adjusting input. For example, a first priority input circuit 110 of a first payment card 102 of a plurality of payment cards 102 may receive a priority adjusting input.

In some non-limiting embodiments or aspects, each respective payment card 102 may include a respective priority input circuit 110, a respective priority indication circuit 112, and/or a respective communication circuit 114, as described herein. In some non-limiting embodiments or aspects, each respective priority input circuit 110 of each respective payment card 102 may include and/or be connected to at least one touchpoint 106, 108, as described herein. In some non-limiting embodiments or aspects, receiving the priority adjusting input may include receiving the priority adjusting input via one of touchpoints 106, 108 of payment card(s) 102.

In some non-limiting embodiments or aspects, each respective priority indication circuit 112 of each respective payment card 102 may include a respective memory and/or a respective processor, as described herein. Additionally or alternatively, each respective priority indication circuit 112 may store a respective priority indicator for the respective payment card 102 in the respective memory.

As shown in FIG. 3A at step 304, process 300 may include adjusting the respective priority indicator of a payment card. For example, the priority indication circuit 112 of the payment card 102 may, in response to receiving the priority adjusting input, adjust the respective priority indicator of the payment card 102 based on the priority adjusting input.

In some non-limiting embodiments or aspects, the priority input circuit 110 may transmit the priority adjusting input to the priority indication circuit 112 of the payment card 102. In some non-limiting embodiments or aspects, the priority indication circuit 112 may receive the priority adjusting input from the priority input circuit 110. In some non-limiting embodiments or aspects, in response to receiving the priority adjusting input, the priority indication circuit 112 may convert the priority adjusting input to a binary value to provide the respective priority indicator of the payment card 102.

In some non-limiting embodiments or aspects, adjusting the respective priority indicator of the payment card 102 based on the priority adjusting input may include increasing or decreasing the respective priority indicator of payment card 102 based on the priority adjusting input (e.g., based on the priority adjusting input indicating whether to increment or decrement, respectively, the priority indicator).

In some non-limiting embodiments or aspects, each priority indication circuit 112 may include a memory. In some non-limiting embodiments or aspects, after adjusting the respective priority indicator, the priority indication circuit 112 may store the respective priority indicator of the payment card 102 in the memory.

In some non-limiting embodiments or aspects, each respective priority indication circuit 112 may communicate the respective priority indicator of each respective payment card 102 to the respective communication circuit 114.

As shown in FIG. 3A at step 306, process 300 may include receiving a polling request from a transaction terminal. For example, each respective communication circuit 114 of each respective payment card 102 may receive a polling request from transaction terminal 104. In some non-limiting embodiments or aspects, the polling request from transaction terminal 104 may include wake-up (e.g., Wake UP command, type A (WUPA)) and/or request (e.g., REQuest command, type A (REQA)) commands.

As shown in FIG. 3A at step 308, process 300 may include transmitting a respective response to the polling request. For example, in response to receiving the polling request, each respective communication circuit 114 of each respective payment card 102 may transmit a respective response to the polling request. In some non-limiting embodiments or aspects, each respective response to the polling request may include the respective priority indicator for the respective payment card 102.

In some non-limiting embodiments or aspects, the respective priority indicator of the first payment card 102 may indicate a highest priority. For example, the respective priority indicator of the first payment card 102 may indicate the highest priority for selection for contactless payment by transaction terminal 104.

In some non-limiting embodiments or aspects, each respective response to the polling request may include at least two bytes (e.g., a first byte, a second byte, etc.). Additionally or alternatively, each respective response to the polling request may include at least one bit indicating the respective priority indicator for the respective payment card 102. In some non-limiting embodiments or aspects, the bit(s) may be included in the first byte or the second byte, or the bit(s) may be in addition to the first byte and the second byte. In some non-limiting embodiments or aspects, each respective response to the polling request may include an answer (e.g., Answer To request, type A (ATQA)).

Referring now to FIG. 3B, shown is a flow diagram of a process 310 for automatically selecting one of a plurality of cards for contactless payment according to some non-limiting embodiments or aspects. In some non-limiting embodiments or aspects, one or more steps of process 310 may be executed by transaction terminal 104. Additionally or alternatively, one or more steps of process 310 may be executed (e.g., completely, partially, and/or the like) by another system, another device, another group of systems, or another group of devices, separate from or including transaction terminal 104, such as payment card(s) 102.

As shown in FIG. 3B at step 312, process 310 may include receiving transaction data. For example, transaction terminal 104 may receive transaction data associated with at least one transaction. In some non-limiting embodiments or aspects, the transaction data may include transaction amount data associated with a transaction amount of a payment transaction (e.g., a transaction amount, a total transaction amount, a cost of each item involved in the transaction, any combination thereof, and/or the like), transaction identifier data associated with an identifier of the payment transaction (e.g., a reference number, a unique identifier, a transaction identifier, a unique transaction identifier (UTI), a merchant identifier, a merchant order identifier, a merchant order identification number, a POS device identifier, any combination thereof, and/or the like), product data associated with a product involved in the payment transaction (e.g., a name of the product, a name of a type of the product, a stock keeping unit (SKU) number associated with a product, a merchant code associated with a product, and/or the like), transaction time data associated with a time of the payment transaction (e.g., a time of day; a day of the week; a day of a month; a month of a year; a predetermined time of day segment such as morning, afternoon, evening, night, and/or the like; a predetermined day of the week segment such as weekday, weekend, and/or the like; a predetermined segment of a year such as first quarter, second quarter, and/or the like; any combination thereof; and/or the like), transaction type data associated with a transaction type of the payment transaction (e.g., an online transaction, a card present transaction, a face-to-face transaction, any combination thereof, and/or the like), any combination thereof, and/or the like.

As shown in FIG. 3B at step 314, process 310 may include communicating a polling request to a plurality of payment cards. For example, in response to receiving the transaction data, transaction terminal 104 may communicate a polling request to payment cards 102 within an operating range of transaction terminal 104. In some non-limiting embodiments or aspects, transaction terminal 102 may communicate the polling request to payment cards 102 via a short range wireless communication connection, as described herein.

As shown in FIG. 3B at step 316, process 310 may include receiving a respective response to the polling request from each respective payment card of the plurality of payment cards. For example, transaction terminal 104 may receive a respective response to the polling request from each respective payment card 102 (e.g., within an operating range of transaction terminal 104). In some non-limiting embodiments or aspects, each respective response to the polling request may include the respective priority indicator for the respective payment card 102. For example, the respective response to the polling request from a first payment card 102 may include the respective priority indicator for the first payment card 102.

As shown in FIG. 3B at step 318, process 310 may include determining that the respective priority indicator of a first payment card of the plurality of payment cards indicates the highest priority. For example, transaction terminal 104 may determine that the respective priority indicator of the first payment card 102 of the plurality of payment cards 102 indicates a highest priority.

In some non-limiting embodiments or aspects, the respective priority indicator of the first payment card 102 may be a first priority indicator. In some non-limiting embodiments or aspects, the first priority indicator may be higher than a respective priority indicator of each of the remaining plurality of payment cards 102.

As shown in FIG. 3B at step 320, process 310 may include selecting the payment card with the highest priority (e.g., the first payment card) for contactless payment. For example, transaction terminal 104 may select the first payment card 102 for contactless payment based on the respective priority indicator of the first payment card 102 indicating the highest priority.

In some non-limiting embodiments or aspects, selecting the first payment card 102 for contactless payment may include comparing the respective priority indicator of each respective payment card 102. For example, transaction terminal 104 may compare the respective priority indicator of each respective payment card 102 of the plurality of payment cards 102. In some non-limiting embodiments or aspects, selecting the first payment card 102 for contactless payment may include determining the first payment card 102 has a greatest priority indicator. For example, transaction terminal 104 may determine that the first payment card 102 has a priority indicator that is greater than a respective priority indicator of each of the remaining plurality of payment cards 102. In some non-limiting embodiments or aspects, selecting the first payment card 102 for contactless payment may include selecting the first payment card 102 based on the first payment card 102 having the lowest priority indicator. For example, transaction terminal 104 may select the first payment card 102 for contactless payment based on the first payment card 102 having the lowest priority indicator of the payment cards 102.

In some non-limiting embodiments or aspects, transaction terminal 104 may generate a communication. For example, transaction terminal 104 may generate a communication based on the respective response to the polling request of each payment card 102 detected within the operating range of transaction terminal 104. In some non-limiting embodiments or aspects, transaction terminal 104 may display the communication and/or data associated therewith. For example, transaction terminal 104 may display data associated with the communication via a graphical user interface (GUI) of transaction terminal 104. In some non-limiting embodiments or aspects, the communication may include a message and/or a notification. For example, in a case where transaction terminal 104 determines that one of the payment cards 102 located in container 118 has a highest priority indicator, transaction terminal 104 may generate a communication and display data associated with the communication via the GUI of transaction terminal 104, and the communication may include a message indicating that the transaction terminal 104 selected the payment card 102 with the highest priority. Additionally or alternatively, in a case where transaction terminal 104 determines that two or more of the payment cards 102 located in container 118 have the same highest priority indicator, transaction terminal 104 may generate a communication and display data associated with the communication via the GUI of transaction terminal 104, and the communication may include a message indicating that the transaction terminal 104 cannot select a payment card 102 and/or instructing the user to manually select a payment card 102 to process the transaction.

The number and arrangement of steps shown in FIGS. 3A and 3B are provided as an example. In some non-limiting embodiments or aspects, process 300 may include additional steps, fewer steps, different steps, or differently arranged steps than those shown in FIG. 3A. In some non-limiting embodiments or aspects, process 310 may include additional steps, fewer steps, different steps, or differently arranged steps than those shown in FIG. 3B.

Figure 4A:
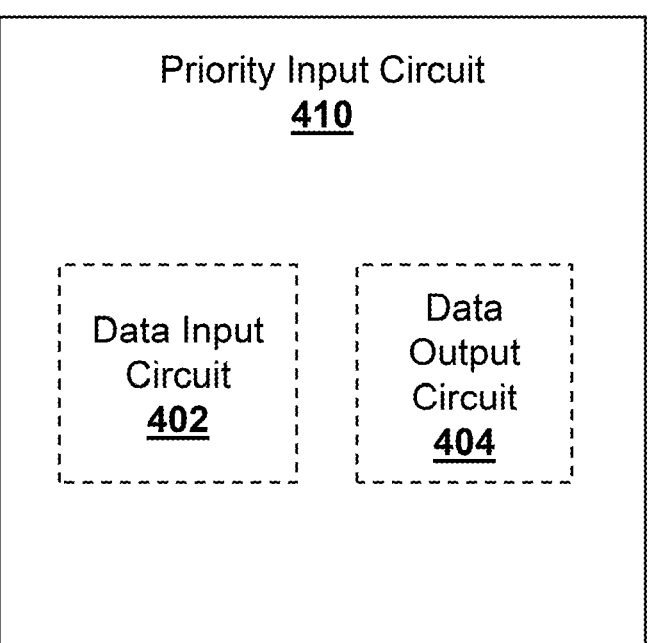
FIG. 4A is a diagram of an exemplary implementation of a priority input circuit according to non-limiting embodiments or aspects of the disclosed subject matter.

Referring now to FIG. 4A, shown is an exemplary implementation 400 of a priority input circuit 410 according to non-limiting embodiments or aspects of the disclosed subject matter. In some non-limiting embodiments or aspects, implementation 400 may include priority input circuit 410. In some non-limiting embodiments or aspects, priority input circuit 410 may include data input circuit 402 and/or data output circuit 404. In some non-limiting embodiments or aspects, priority input circuit 410 may be the same as or similar to priority input circuit 110.

In some non-limiting embodiments or aspects, data input circuit 402 may receive an input. For example, data input circuit 402 may receive a priority adjusting input from a user via touchpoints (e.g., touchpoints 106, 108). In some non-limiting embodiments or aspects, data input circuit 402 may be in communication with data output circuit 404.

In some non-limiting embodiments or aspects, data output circuit 404 may receive an input from data input circuit 402. For example, data output circuit 404 may receive the priority adjusting input from data input circuit 402. In some non-limiting embodiments or aspects, data output circuit 404 may be in communication with a priority indication circuit (e.g., priority indication circuit 112).

Figure 4B:
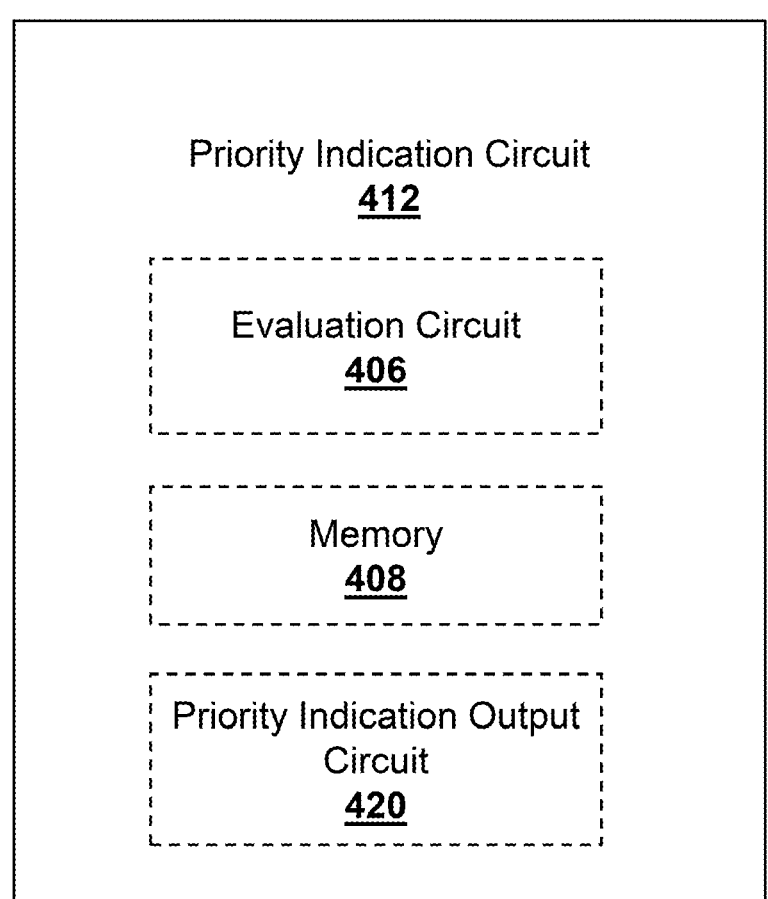
FIG. 4B is a diagram of an exemplary implementation of a priority indication circuit according to non-limiting embodiments or aspects of the disclosed subject matter.

Referring now to FIG. 4B, shown is an exemplary implementation 400 of a priority indication circuit according to non-limiting embodiments or aspects of the disclosed subject matter. In some non-limiting embodiments or aspects, implementation 400 may include priority indication circuit 412. As shown in FIG. 4B, priority indication circuit 412 may include evaluation circuit 406, memory 408, and/or priority indication output circuit 420. In some non-limiting embodiments or aspects, priority indication circuit 412 may be the same as or similar to priority indication circuit 112.

In some non-limiting embodiments or aspects, evaluation circuit 406 may be in communication with a priority input circuit (e.g., priority input circuit 410 and/or the like). In some non-limiting embodiments or aspects, evaluation circuit 406 may receive an input from the priority input circuit (e.g., from data output circuit 404 of priority input circuit 410). For example, evaluation circuit 406 of priority indication circuit 412 may receive the priority adjusting input from data output circuit 404 of priority input circuit 410. In some non-limiting embodiments or aspects, in response to receiving the priority adjusting input, evaluation circuit 406 of priority indication circuit 412 may convert the priority adjusting input to a binary value. For example, evaluation circuit 406 of first priority indication circuit 412 may convert the priority adjusting input to a binary value to provide the respective priority indicator for payment card 102. In some non-limiting embodiments or aspects, evaluation circuit 406 may determine the binary value based on the priority adjusting input and the current value of the priority indicator (e.g., just before the input). For example, if the priority adjusting input indicates to increment the priority indicator, evaluation circuit 406 may add 1 to the current value to provide the adjusted value. Additionally or alternatively, if the priority adjusting input indicates to decrement the priority indicator, the evaluation circuit may subtract 1 from the current value to provide the adjusted value. In some non-limiting embodiments or aspects, the binary value (e.g., multiple bits, such as 3 bits, 8 bits, and/or the like) may be the binary representation of the priority indicator.

In some non-limiting embodiments or aspects, a priority indicator may be based on a number of the plurality of payment cards located and/or stored in container 118. For example, if five payment cards are stored and/or located in container 118, a first payment card may have a priority indicator of 4, a second payment card may have a priority indicator of 3, a third payment card may have a priority indicator of 2, a fourth payment card may have a priority indication of 1, and a fifth card may have a priority indicator of 0. An example representation of a card priority indicator for a total of five payment cards is shown below in Table 1.

TABLE 1

| Bit-1 | Bit-2 | Bit-3 | Priority Indicator |
|-------|-------|-------|--------------------|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |

In some non-limiting embodiments or aspects, evaluation circuit 406 may set the respective priority indicator for a respective payment card (e.g., payment card 102). For example, evaluation circuit 406 may set the respective priority indicator for payment card 102 based on the binary value. In some non-limiting embodiments or aspects, a first value of a priority indicator that is higher than a second value of a priority indicator may indicate a higher priority level for selecting a payment card for contactless payment.

In some non-limiting embodiments or aspects, evaluation circuit 406 may be in communication with memory 408. For example, memory 408 may receive the respective priority indicator for the respective payment card 102 from evaluation circuit 406. In some non-limiting embodiments or aspects, the respective priority indicator for the respective payment card 102 may be stored by memory 408.

In some non-limiting embodiments or aspects, evaluation circuit 406 may adjust the priority indicator of payment card 102. In some non-limiting embodiments or aspects, in response to receiving the priority adjusting input, evaluation circuit 406 may retrieve a stored priority indicator for payment card 102 from memory 408 and increment or decrement the stored priority indicator.

In some non-limiting embodiments or aspects, memory 408 may communicate with priority indication output circuit 420. For example, priority indication output circuit 420 may receive the priority indicator for payment card 102 from memory 408. In some non-limiting embodiments or aspects, priority indication output circuit 420 may communicate with a communication circuit (e.g., communication circuit 114). For example, communication circuit 114 may receive the priority indicator for the respective payment card 102 from priority indication output circuit 420.

In some non-limiting embodiments or aspects, two or more payment cards 102 may have the same priority indicator and/or no priority indicator. For example, two or more payment cards 102 stored and/or located in container 118 may have the same priority indicator and/or no priority indicator. In some non-limiting embodiments or aspects, if two or more payment cards 102 have the same priority indicator, transaction terminal 104 may generate a message indicating that the two or more payment cards 102 have the same priority indicator and may display the message via the GUI of transaction terminal 104. For example, if two or more payment cards 102 have the highest priority indicator, transaction terminal 104 may generate a message indicating that transaction terminal 104 cannot select a payment card for contactless payment and display data associated with the message via the GUI of transaction terminal 104. In some non-limiting embodiments or aspects, if a payment card 102 has no priority indicator it may be ignored by transaction terminal 104. For example, if, in response to the polling request from transaction terminal 104, a second payment card 102 does not return a response to the polling request including a respective priority indicator of the second payment card 102 (e.g., and a first payment card 102 does return a response to the polling request including a respective priority indicator of the first payment card 102), the second payment card 102 may be ignored by transaction terminal 104 (e.g., and the first payment card 102 may be selected for contactless payment by transaction terminal 104).

Figure 5:
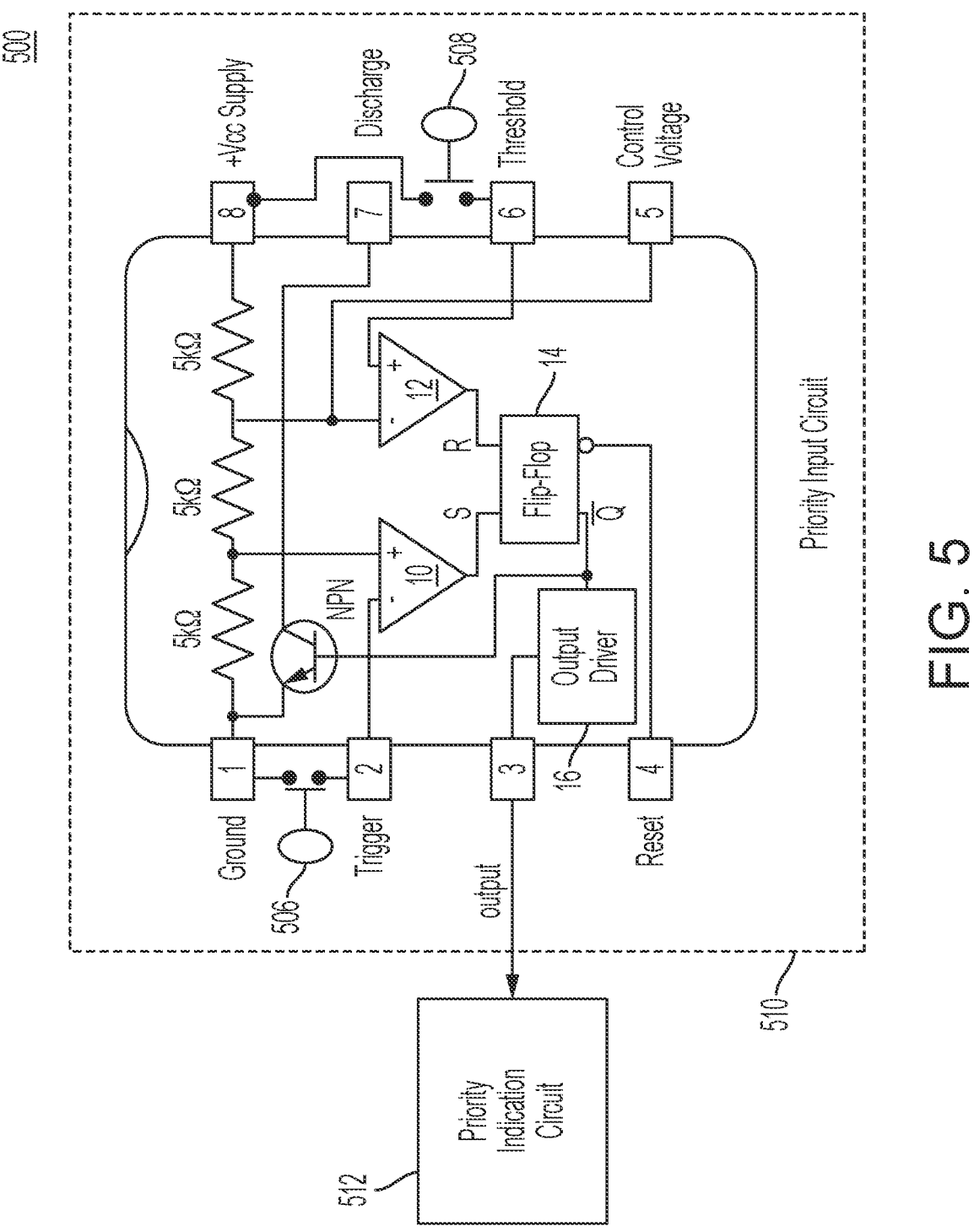
FIG. 5 is a diagram of an exemplary implementation of a priority input circuit according to non-limiting embodiments or aspects of the disclosed subject matter.

Referring now to FIG. 5, shown is a diagram of an exemplary implementation 500 of a priority input circuit according to non-limiting embodiments or aspects of the disclosed subject matter. In some non-limiting embodiments or aspects, implementation 500 may include touchpoints 506, 508, priority input circuit 510, and/or priority indication circuit 512. In some non-limiting embodiments or aspects, touchpoints 506, 508, priority input circuit 510, and priority indication circuit 512 may be the same as, similar to, and/or part of touchpoints 106, 108, priority input circuit 110, 410, and priority indication circuit 112, 412, respectively.

As shown in FIG. 5, priority input circuit 510 may include a 555 timer circuit (e.g., a 555 timer oscillator circuit). In some non-limiting embodiments or aspects, the 555 timer circuit may include ground pin 1, trigger pin 2, output pin 3, reset pin 4, control voltage pin 5, threshold pin 6, discharge pin 7, +Vcc supply pin 8, comparators 10, 12, flip-flop 14, and/or output driver 16. In some non-limiting embodiments or aspects, touchpoints 506, 508 may be connected to respective pins of the 555 timer oscillator circuit. For example, touchpoint 506 may be connected between ground pin 1 and trigger pin 2. Additionally or alternatively, touchpoint 508 may be connected between threshold pin 6 and +Vcc supply pin 8.

In some non-limiting embodiments or aspects, ground pin 1 may be connected to 0V (e.g., ground). In some non-limiting embodiments or aspects, trigger pin 2 may be connected to the negative input of comparator 10. In some non-limiting embodiments or aspects, trigger pin 2 may set a state of flip-flop 14, which may be configured to cause the output pin 3 to switch from a low state to a high state.

In some non-limiting embodiments or aspects, touchpoint 506 may be located between ground pin 1 and trigger pin 2. For example, touchpoint 506 may be a pushbutton switch located between ground pin 1 and trigger pin 2. In some non-limiting embodiments or aspects, touchpoint 506 may be used to receive an input that causes trigger pin 2 to set the state of flip-flop 14, thereby causing output pin 3 to switch from a low state to a high state. In some non-limiting embodiments or aspects, touchpoint 508 may be located between threshold pin 6 and +Vcc supply pin 8. For example, touchpoint 508 may be a pushbutton switch located between threshold pin 6 and +Vcc supply pin 8. In some non-limiting embodiments or aspects, touchpoint 508 may be used to receive an input that causes threshold pin 5 to set the state of flip-flip 14, thereby casing output pin 3 to switch from a high state to a low state. In some non-limiting embodiments or aspects, touchpoint 506 may be used to increment the priority indicator, and touchpoint 508 may be used to decrement the priority indicator, or vice versa.

In some non-limiting embodiments or aspects, output pin 3 may be connected to priority indication circuit 512. In some non-limiting embodiments or aspects, priority input circuit 510 may provide an output via output pin 3 to priority indication circuit 512. For example, output pin 3 of priority input circuit 510 may provide a signal as an output. In some non-limiting embodiments or aspects, a signal output from priority input circuit 510 may be received by priority indication circuit 512. In some non-limiting embodiments or aspects, the signals may be high or low voltage signals. In some non-limiting embodiments or aspects, reset pin 4 may be connected to flip-flop 14. In some non-limiting embodiments or aspects, reset pin 4 may be configured to reset a state of flip-flop 14. In some non-limiting embodiments or aspects, control voltage pin 5 may control the timing of the priority input circuit 510. In some non-limiting embodiments or aspects, control voltage pin 5 may be connected to ground. In some non-limiting embodiments or aspects, threshold pin 6 may be connected to a positive input of comparator 12. Threshold pin 6 may be used to reset flip-flop 14 when the applied voltage causes the output pin 3 to switch from a high state to a low state. In some non-limiting embodiments or aspects, discharge pin 7 may be connected to the collector of a discharge circuit (e.g., an NPN transistor and/or the like). For example, the NPN transistor may be configured to discharge a timing capacitor of the 555 timer circuit (e.g., to 0V) when the output of output pin 3 switches to a low state. In some non-limiting embodiments or aspects, +Vcc supply pin 8 may be connected to a power supply.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method for automatically selecting one of a plurality of payment cards for contactless payment, comprising:

receiving, by a first priority input circuit of a first payment card of a plurality of payment cards, a priority adjusting input, wherein each respective payment card of the plurality of payment cards comprises a respective priority input circuit, a respective priority indication circuit, and a respective communication circuit, wherein each respective priority input circuit comprises at least two touchpoints located on a respective payment card, wherein the priority adjusting input is received via one of the at least two touchpoints of the first payment card, wherein each respective priority indication circuit stores a respective priority indicator for the respective payment card, wherein the respective priority input circuit of the first payment card comprises the first priority input circuit, wherein the respective priority indication circuit of the first payment card comprises a first priority indication circuit, and wherein the respective communication circuit of the first payment card comprises a first communication circuit;

in response to receiving the priority adjusting input, adjusting, by the first priority indication circuit, the respective priority indicator of the first payment card based on the priority adjusting input;

receiving, by each respective communication circuit of each respective payment card of the plurality of payment cards, a polling request from a transaction terminal; and in response to receiving the polling request, transmitting, by each respective communication circuit of each respective payment card of the plurality of payment cards, a respective response to the polling request, each respective response to the polling request comprising the respective priority indicator for the respective payment card, wherein the respective priority indicator of the first payment card indicates a highest priority for selection for contactless payment by the transaction terminal.

2. The method of claim 1, wherein each respective priority indication circuit of each respective payment card of the plurality of payment cards comprises a respective memory and a respective processor.

3. The method of claim 1, further comprising:

transmitting, by the first priority input circuit, the priority adjusting input to the first priority indication circuit.

4. The method of claim 3, further comprising:

receiving, by the first priority indication circuit, the priority adjusting input from the first priority input circuit; and in response to receiving the priority adjusting input, converting, by the first priority indication circuit, the priority adjusting input to a binary value to provide the respective priority indicator of the first payment card.

5. The method of claim 1, wherein adjusting the respective priority indicator of the first payment card based on the priority adjusting input comprises:

increasing the respective priority indicator of the first payment card based on the priority adjusting input; or decreasing the respective priority indicator of the first payment card based on the priority adjusting input.

6. The method of claim 1, wherein the first priority indication circuit comprises a memory, the method further comprising, after adjusting the respective priority indicator, storing, by the first priority indication circuit, the respective priority indicator of the first payment card in the memory.

7. The method of claim 1, further comprising:

communicating, by the first priority indication circuit, the respective priority indicator of the first payment card to the first communication circuit.

8. The method of claim 1, wherein each respective payment card of the plurality of payment cards comprises:

a respective first chip, a respective second chip separate from the respective first chip, and a respective third chip separate from the respective first chip and the respective second chip;

wherein the respective first chip of the first payment card comprises the first priority input circuit;

wherein the respective second chip of the first payment card comprises the first priority indication circuit; and wherein the respective third chip of the first payment card comprises the first communication circuit.

9. The method of claim 8, wherein the respective second chip of the first payment card is configured to communicate with the respective first chip of the first payment card and the respective third chip of the first payment card.

10. A system for automatically selecting one of a plurality of payment cards for contactless payment, the system comprising:

the plurality of payment cards, wherein each respective payment card of the plurality of payment cards comprises:

a respective priority input circuit, wherein each respective priority input circuit comprises at least two touchpoints located on a respective payment card;

a respective priority indication circuit, each respective priority indication circuit storing a respective priority indicator for the respective payment card; and a respective communication circuit, wherein the plurality of payment cards comprises a first payment card, the respective priority input circuit of the first payment card comprising a first priority input circuit, the respective priority indication circuit of the first payment card comprising a first priority indication circuit, the respective communication circuit of the first payment card comprising a first communication circuit, the first payment card configured to:

receive, by the first priority input circuit, a priority adjusting input via one of the at least two touchpoints of the first payment card; and in response to receiving the priority adjusting input, adjust, by the first priority indication circuit, the respective priority indicator of the first payment card based on the priority adjusting input, and wherein each respective payment card of the plurality of payment cards is configured to:

receive, by each respective communication circuit of each respective payment card of the plurality of payment cards, a polling request from a transaction terminal; and in response to receiving the polling request, transmit, by each respective communication circuit of each respective payment card of the plurality of payment cards, a respective response to the polling request, each respective response to the polling request comprising the respective priority indicator for the respective payment card, the respective priority indicator of the first payment card indicating a highest priority for selection for contactless payment by the transaction terminal.

11. The system of claim 10, wherein each respective priority indication circuit of each respective payment card of the plurality of payment cards comprises a respective memory and a respective processor.

12. The system of claim 10, wherein the first payment card is further configured to:

transmit, by the first priority input circuit, the priority adjusting input to the first priority indication circuit.

13. The system of claim 12, wherein the first payment card is further configured to:

receive, by the first priority indication circuit, the priority adjusting input from the first priority input circuit; and in response to receiving the priority adjusting input, convert, by the first priority indication circuit, the priority adjusting input to a binary value to provide the respective priority indicator of the first payment card.

14. The system of claim 10, wherein, when adjusting the respective priority indicator of the first payment card based on the priority adjusting input, the first payment card is configured to:

increase the respective priority indicator of the first payment card based on the priority adjusting input; or decrease the respective priority indicator of the first payment card based on the priority adjusting input.

15. The system of claim 10, wherein the first priority indication circuit comprises a memory, and wherein the first payment card is further configured to:

after adjusting the respective priority indicator, store the respective priority indicator of the first payment card in the memory.

16. The system of claim 10, wherein the first payment card is further configured to:

communicate, by the first priority indication circuit, the respective priority indicator of the first payment card to the first communication circuit.

17. The system of claim 10, wherein each respective payment card of the plurality of payment cards comprises:

a respective first chip, a respective second chip separate from the respective first chip, and a respective third chip separate from the respective first chip and the respective second chip, wherein the respective first chip of the first payment card comprises the first priority input circuit, wherein the respective second chip of the first payment card comprises the first priority indication circuit, and wherein the respective third chip of the first payment card comprises the first communication circuit.

18. The system of claim 17, wherein the respective second chip of the first payment card is configured to communicate with the respective first chip of the first payment card and the respective third chip of the first payment card.

\* \* \* \* \*